(12) United States Patent
Bird

(10) Patent No.: US 10,322,425 B2
(45) Date of Patent: *Jun. 18, 2019

(54) WATER ATOMISATION DEVICE

(71) Applicant: Minetek Investments Pty Ltd, McDougalls Hill (AU)

(72) Inventor: Garth John Bird, Singleton (AU)

(73) Assignee: MINETEK INVESTMENTS PTY LTD, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/610,481

(22) Filed: May 31, 2017

(65) Prior Publication Data

US 2017/0259283 A1 Sep. 14, 2017

Related U.S. Application Data

(63) Continuation of application No. 13/714,283, filed on Dec. 13, 2012, now Pat. No. 9,694,373.

(30) Foreign Application Priority Data

Oct. 4, 2012 (AU) ................................ 2012238201

(51) Int. Cl.
*B05B 7/06* (2006.01)
*B05B 7/00* (2006.01)
(Continued)

(52) U.S. Cl.
CPC ............ *B05B 7/061* (2013.01); *B05B 7/0075* (2013.01); *E21F 5/02* (2013.01); *C02F 1/12* (2013.01)

(58) Field of Classification Search
CPC . B05B 7/061; B05B 7/075; E21F 5/02; C02F 1/12
(Continued)

(56) References Cited

U.S. PATENT DOCUMENTS 3,945,567 A * 3/1976 Rambach ................. F04F 5/466
239/132.5
3,948,442 A * 4/1976 Dewey ....................... F25C 3/04
239/2.2
(Continued)

OTHER PUBLICATIONS

Non-Final Office Action dated May 29, 2015 from related U.S. Appl. No. 13/714,283, 11 pages.
(Continued)

*Primary Examiner* — Viet Le
(74) *Attorney, Agent, or Firm* — William H. Honaker; Dickinson Wright PLLC

(57) ABSTRACT

A water atomisation device for water evaporation and/or dust control. The device includes: a generally longitudinally hollow housing; a fan; a motor; and a hollow manifold. The housing extends between an inlet end and an outlet end, with the inlet end defining a first air inlet to an interior of the housing. The fan is within the housing, between the inlet end and the outlet end. The motor drives the fan. The manifold is shaped to generally correspond to that of the outlet end and has a plurality of water injector nozzles directed substantially inwardly and away from the outlet end. A distal edge of the outlet end is longitudinally spaced apart from a proximal edge of the manifold to define a second air entrainment inlet to an interior of the manifold.

21 Claims, 2 Drawing Sheets

(51) Int. Cl.
*E21F 5/02* (2006.01)
*C02F 1/12* (2006.01)

(58) Field of Classification Search
USPC .......................... 239/8, 424, 424.5, 2.2, 14.2
See application file for complete search history.

(56) References Cited

U.S. PATENT DOCUMENTS

| | | | | |
|---|---|---|---|---|
| 4,573,636 A | * | 3/1986 | Dilworth | F25C 3/04 239/2.2 |
| 4,711,395 A | * | 12/1987 | Handfield | F25C 3/04 239/14.2 |
| 4,828,175 A | | 5/1989 | Heufler et al. | |

OTHER PUBLICATIONS

Final Office Action dated Feb. 2, 2016 from related U.S. Appl. No. 13/714,283, 15 pages.

* cited by examiner

WATER ATOMISATION DEVICE

CROSS-REFERENCES TO RELATED APPLICATIONS

This application is a continuation of U.S. patent application Ser. No. 13/714,283, filed Dec. 13, 2012, which claims priority to Australian Application No. 2012238201, filed Oct. 4, 2012, the disclosures of which are incorporated by reference herein.

FIELD OF THE INVENTION

The present invention relates to a water atomisation device adapted for water evaporation and/or dust control.

The invention has been primarily developed for use in the draining of bodies of water on mine and construction sites and will be described hereinafter with reference to this application. The invention is also suitable for use in wetting a very large land surface area for dust control in arid environments.

BACKGROUND OF THE INVENTION

Devices are known which are able to atomise water and eject into the atmosphere as a fine mist. These devices are used in snow making and low volume misting for evaporative cooling and/or localised dust control. The disadvantage of such known devices is they are not suitable for large scale waste water evaporation and/or dust control applications.

OBJECT OF THE INVENTION

It is the object of the present invention to substantially overcome or at least ameliorate the above disadvantage.

BRIEF SUMMARY OF THE INVENTION

Accordingly, in a first aspect, the present invention provides a water atomisation device for water evaporation and/or dust control, the device including:

a generally longitudinal hollow housing extending between an inlet end and an outlet end, the inlet end defining a first air inlet to an interior of the housing;

a fan within the housing between the inlet end and the outlet end;

a motor for driving the fan; and a hollow manifold shaped to generally correspond to that of the outlet end and having a plurality of water injector nozzles directed substantially inwardly and away from the outlet end.

wherein a distal edge of the outlet end is longitudinally spaced apart from a proximal edge of the manifold to define a second air entrainment inlet to an interior of the manifold.

The distal edge of the outlet end is longitudinally spaced apart from the proximal edge of the manifold by about 35 mm.

The housing is preferably generally cylindrical. The housing inlet end preferably includes a venturi part, converging towards the outlet end. The housing outlet end preferably includes a tapered part, converging away from the inlet end. The device preferably includes an air flow straightener, within the housing, between the fan and the tapered part. The housing preferably includes a cylindrical part between the venturi part and the air flow straightener. The fan and the majority of the motor are preferably mounted within the cylindrical part.

The manifold is preferably annular, with a substantially round cross section.

The motor is preferably about 75 kilowatts. The motor and fan are preferably adapted to eject air from the housing at about 45 metres/second. The water injectors are preferably adapted to inject water at about 24 litres/second. The motor, fan and water injectors are preferably adapted to discharge at least 2000 litres of air for every 1 litre of atomised water.

The nozzles each preferably have a water opening therein of about 3.2 mm in diameter.

The housing is preferably about 1220 mm in diameter.

In a second aspect, the present invention provides a water atomisation device adapted capable of discharging at least 2000 litres of air for every 1 litre of atomised water, the device including:

a generally longitudinally hollow housing about 1220 mm in diameter and extending between an inlet end and an outlet end, the inlet end defining a first air inlet to an interior of the housing;

a fan within the housing between the inlet end and the outlet end;

a motor of about 75 kilowatts for driving the fan to eject air from the housing at about 45 metres/second; and a hollow manifold shaped to generally correspond to that of the outlet end and having a plurality of water injector nozzles directed substantially inwardly and away from the outlet end to inject water at about 24 litres/second, wherein a distal edge of the outlet end is longitudinally spaced apart from a proximal edge of the manifold by about 35 mm to create a second air entrainment inlet to an interior of the manifold.

In a third aspect, the present invention provides a method of operating a water atomisation device for water evaporation and/or dust control, the device including: a generally longitudinally hollow housing extending between an inlet end and an outlet end, the inlet end defining a first air inlet to an interior the housing; a fan within the housing between the inlet end and the outlet end; a motor for driving the fan; and a hollow manifold shaped to generally correspond to that of the outlet end and having a plurality of water injector nozzles directed substantially inwardly and away from the outlet end, a distal edge of the outlet end is longitudinally spaced apart from a proximal edge of the manifold to define a second air entrainment inlet to an interior of the manifold, the method including the steps of:
1. energising the motor to rotate the fan and draw air into the housing inlet end and eject it from the housing outlet end;
2. pumping water through the injectors;
3. atomising the water leaving the injectors by impacting it with the air ejected by the fan; and
4. entraining additional air through the second air entrainment inlet into the air ejected by the fan.

BRIEF DESCRIPTION OF THE DRAWINGS

A preferred embodiment of the invention will now be described, by way of an example only, with reference to the accompanying drawings in which.

DETAILED DESCRIPTION OF THE INVENTION

Figure 1:
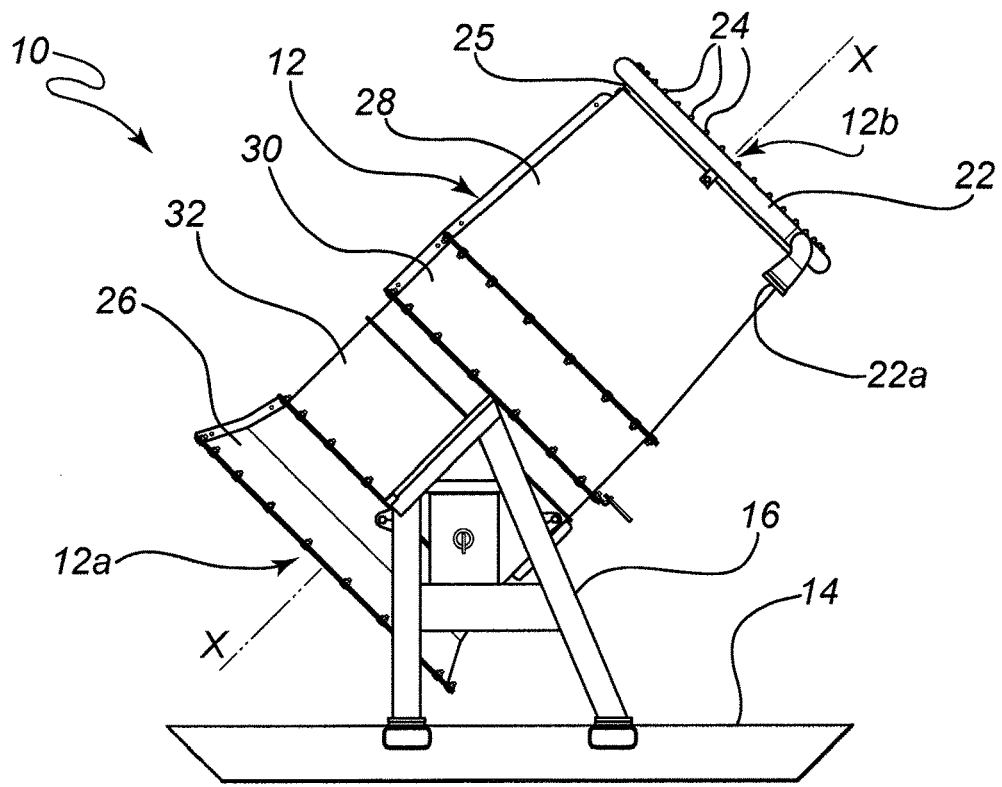
FIG. 1 is a side view of an embodiment of a water atomisation device.
Figure 2:
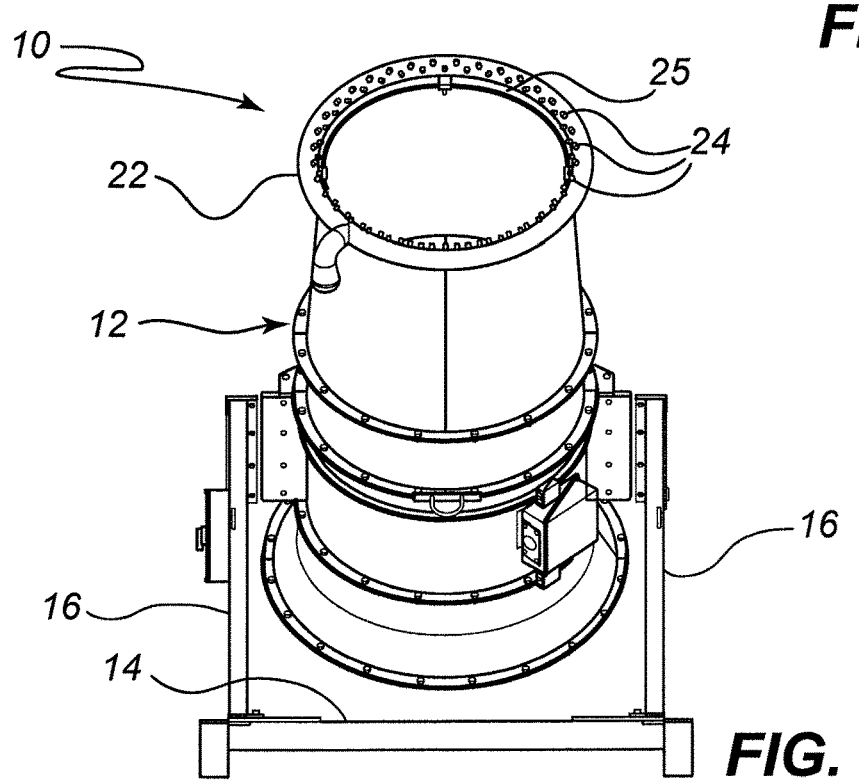
FIG. 2 is front view of the device shown in FIG. 1.
Figure 3:
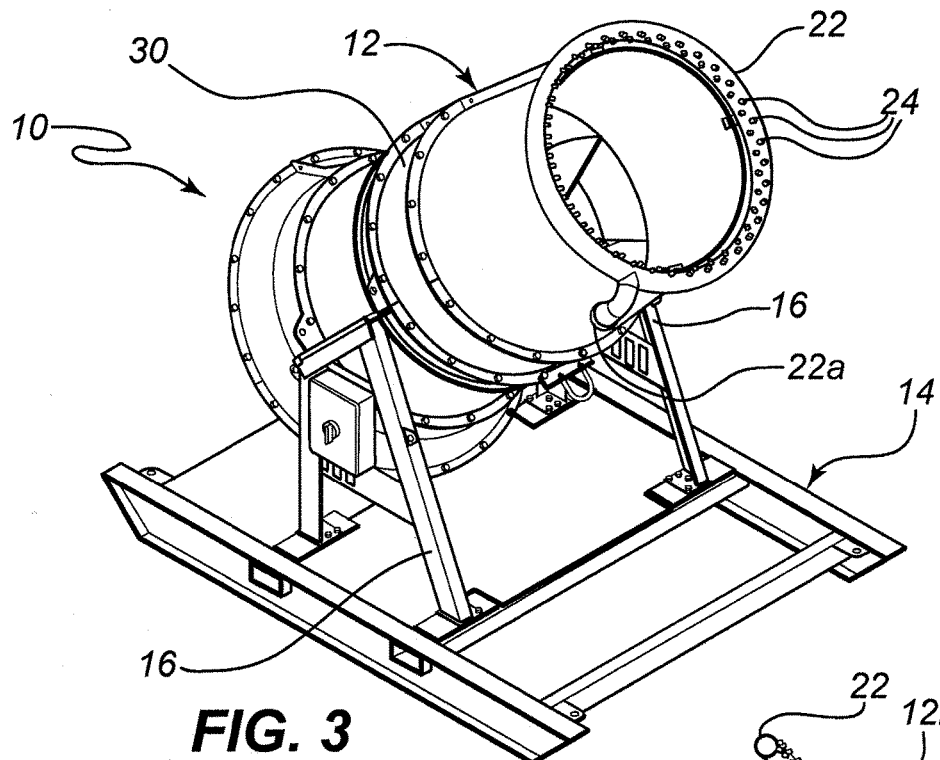
FIG. 3 is a front perspective view of the device shown in FIG. 1.

FIGS. 1 to 4 show an embodiment of a water atomisation device 10 used to drain bodies of water on mine or construction sites and also to wet a large land surface area for dust control in arid environments.

The device 10 includes a steel, generally longitudinal, cylindrical hollow housing 12. The housing 12 has a diameter of about 1200 mm and is about 2400 mm long. The housing 12 extends between an inlet end 12a and an outlet end 12b. The inlet end 12a defines a first air inlet to an interior of the housing 12.

The housing 12 is mounted to a skid plate assembly 14 by a pair of brackets 16. The brackets 16 allow the angle of the longitudinal axis x-x of the housing 12 to be adjusted in order to adjust the trajectory of the material ejected from the device 10. The skid plate assembly 14 allows the device 10 to be moved using a forklift, as is well understood by persons skilled in the art.

Figure 4:
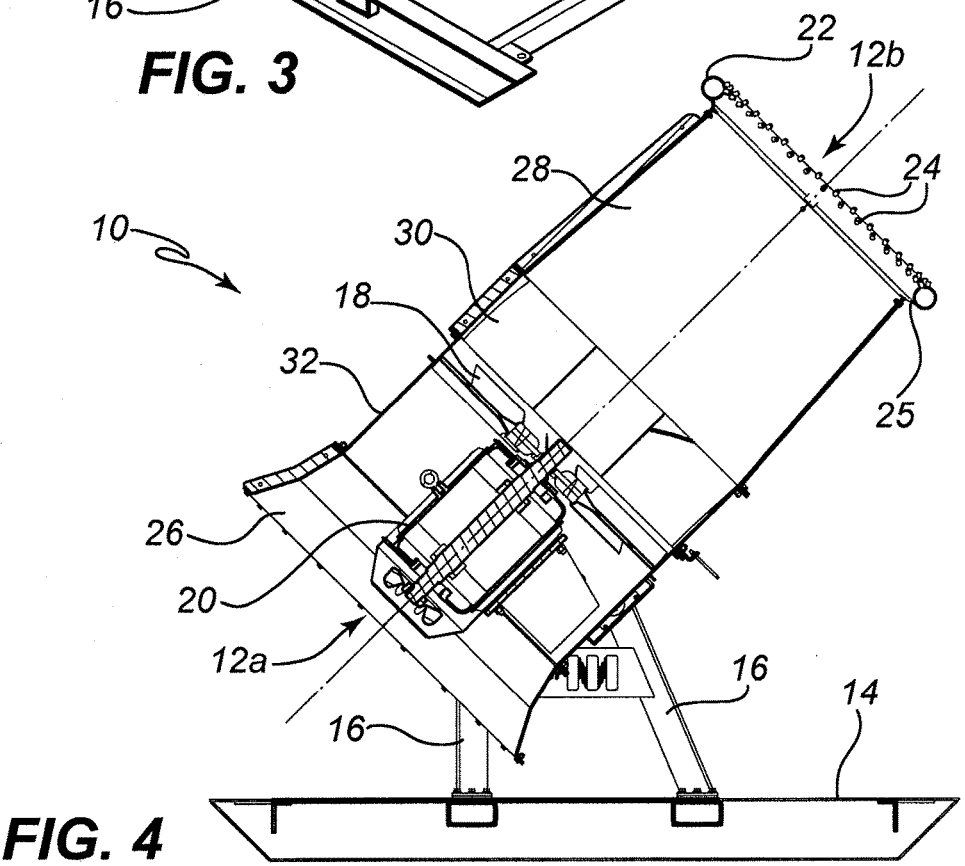
FIG. 4 is a cross sectional side view of the device shown in FIG. 1.

As best shown in FIG. 4, the device 10 includes a fan 18 within the housing 12, between the inlet end 12a and the outlet end 12b. A 75 kilowatt electric motor 20 drives the fan 18.

A hollow annular manifold 22 is mounted to the housing 12 near the outlet end 12b. The manifold 22 is sized and shaped to generally correspond to the size and shape of the outlet end 12b and has a prurality of water injector nozzles 24 which are directed substantially inwardly and away from the outlet end 12b. The nozzles 24 have an internal diameter of about 3.2 mm. This allows relatively dirty water to be pumped through the nozzles without clogging.

A distal edge of the outlet end 12b of the housing 12 is longitudinally spaced apart from a proximal edge of the manifold 22 in order to create an annular gap 25 therebetween of approximately 35 mm in the direction of the longitudinal axis x-x of the housing 12. The manifold 22 has an inlet fitting 22a suitable for connection to a water hose.

As previously mentioned, the housing 12 is generally cylindrical. The housing inlet end 12a includes a venturi part 26, which converges towards the outlet end 12b. The housing outlet end 12b includes a tapered part 28, which converges away from the inlet in 12b. An air flow straightener 30 is positioned within the housing 12, between the fan 18 and the tapered part 28. The housing 12 also includes a cylindrical part 32 between the venturi part 26 and the air flow straightener 30. The fan 18 and the majority of the motor 20 are mounted within the cylindrical part 32.

The operation of the device 10 will now be described. To operate the device 10, the motor 20 is energised to rotate the fan to cause air to be drawn into the inlet 12a and ejected from the outlet 12b at about 45 m/sec. Simultaneously, an external pump (not shown) is connected to the inlet fitting 22a and used to pump water through the nozzles 24 at about 24 litres/second. The water leaving the injectors 24 is atomised when it comes in the contact with the high velocity air (45 m/sec) being ejected from the housing 12 as a plume of air and atomised water. The motor 20 and the fan 18 discharge at least about 2000 litres of air for every 1 litre of atomised water pumped through the water nozzles 24.

As the air passes through the opening in the manifold 22, and past the nozzles 24, it causes additional air to be entrained through the gap 25 between the housing 12 and the manifold 22. The entraining of the additional air through the gap 25 induces a larger volume airstream from the surrounding environment and thereby carries the plume of air and atomised water higher into the atmosphere then would be case without such additional entrained air. This increases the amount of time the atomised water droplets spend in the air and therefore increases the evaporation rate thereof. This also enable the device 10 to be operated with the relatively high water injection rates (about 24 litres/sec) whilst still maintaining a suitable water droplet size. Accordingly, this enables the device 10 to be particularly suitable for relatively fast draining and evaporation of relatively large bodies of water. The combination of the mechanical fracturing of the water particles, the high airstream velocity at the outlet end 12b of the housing 12, the relatively large volume of air actually discharged and the entrained surrounding air enables a significant performance increase in evaporation and also in the control of dust particles when the device is used for dust control.

Although, the invention has been described with reference to a preferred embodiment, it will be appreciated by persons skilled in the art that the invention can be embodied in many other forms. For example, acoustic shielding can be added to the housing to reduce the noise generated by the device.

What is claimed is:

1. A device for reducing a volume of a body of water by accelerating water evaporation into a surrounding atmosphere, the device including:
   a housing having a passage extending between an inlet end and an outlet end thereof, the inlet end defining a first air entrainment inlet into the passage;
   a motorized fan arranged to draw air from the first air entrainment inlet and eject a first air stream from the outlet end; and
   a manifold having a shape configured to substantially correspond to that of the outlet end and having a plurality of water nozzles including first nozzles and second nozzles located substantially about the manifold, the water being pumpable through the plurality of water nozzles so as to reduce the volume of the body of water; wherein the first nozzles are configured to direct water in first water streams substantially toward a center of the first air stream and the second nozzles are configured to direct water in second water streams that are relatively more inline with the first air stream, and
   wherein at least some of the first nozzles and second nozzles are in an alternately staggered arrangement relative to one another about the manifold.

2. The device according to claim 1, wherein most of the first nozzles and the second nozzles are in an alternately staggered arrangement relative to one another about the manifold.

3. The device according to claim 1, wherein all of the first nozzles and the second nozzles are in an alternately staggered arrangement relative to one another continuously about the manifold.

4. The device according to claim 1, wherein the device includes a second air entrainment inlet arranged to induce a second air stream from the surrounding atmosphere into an interior of the manifold, the second air stream being in addition to the first air stream.

5. The device according to claim 4, wherein a gap is provided between the manifold and the outlet end so as to provide the second air entrainment inlet.

6. The device according to claim 5, wherein a distal edge of the outlet end is longitudinally spaced apart from a proximal edge of the manifold to define the gap for the second air entrainment inlet.

7. The device according to claim 1, wherein the housing is cylindrical and defines the passage extending longitudinally between the inlet end and the outlet end.

8. The device according to claim 7, wherein the housing includes an airflow straightener between the fan and the outlet end.

9. The device according to claim 8, wherein the inlet end of the housing includes a venturi part, converging towards the outlet end.

10. The device according to claim 9, wherein the housing includes a cylindrical part between the venturi part and the air flow straightener.

11. The device according to claim 10, further including an airflow straightener, within the housing, between the fan and the tapered part.

12. The device according to claim 1, wherein the outlet end of the housing includes a tapered part, converging away from the inlet end.

13. The device according to claim 1, wherein the manifold is annular, with a substantially round cross section.

14. The device according to claim 1, wherein a diameter of the manifold is larger than a diameter of the outlet end.

15. The device according to claim 1, further including a motor substantially housed by the housing and arranged to drive the fan.

16. The device according to claim 1, wherein the first nozzles are arranged such that the first water streams are angled at about 60 degrees relative to the first air stream and the second nozzles are arranged such that the second water streams are angled at about 30 degrees relative to the first air stream.

17. A device for reducing a volume of a body of water by accelerating water evaporation into a surrounding atmosphere, the device including:
   a housing having a passage extending between an inlet end and an outlet end thereof, the inlet end defining a first air entrainment inlet into the passage;
   a motorized fan arranged to draw air from the first air entrainment inlet and eject a first air stream outwardly of the outlet end;
   a manifold having a shape configured to substantially correspond to that of the outlet end and having a plurality of water nozzles including first nozzles and second nozzles located substantially about the manifold, the water being pumpable through the plurality of water nozzles; and
   a second air entrainment inlet arranged to induce a second air stream from the surrounding atmosphere into an interior of the manifold, the second air stream being in addition to the first air stream;
   wherein the first nozzles and a second nozzles are in an alternately staggered arrangement relative to one another about the manifold, and wherein the first nozzles are configured to direct water in first water streams substantially toward a center of the first air stream and the second nozzles are configured to direct water in second water streams that are relatively more inline with the first air stream.

18. A device for reducing a volume of a body of water by accelerating water evaporation into a surrounding atmosphere, the device including:
   a housing defining a passage extending between an inlet end and an outlet end thereof, the inlet end defining a first air entrainment inlet into the passage;
   a motorized fan located relative to the passage to draw air from the first air entrainment inlet and eject a first air stream outwardly of the outlet end; and
   a manifold having a shape configured to substantially correspond to that of the outlet end, the manifold and having a plurality of water nozzles including first nozzles and second nozzles in an alternately staggered arrangement relative to one another continuously about the manifold, the first and second nozzles being arranged to direct water at respective first and second water stream angles toward the first air stream, wherein the second water stream angle is relatively more inline with the first air stream in comparison to the first water stream angle.

19. The device according to claim 18, wherein the first water stream angle is about 60 degrees relative to the first air stream and the second water stream angle is about 30 degrees relative to the first air stream.

20. A device for reducing a volume of a body of water by accelerating water evaporation into a surrounding atmosphere, the device including:
   a housing having a passage extending between an inlet end and an outlet end thereof, the inlet end defining a first air entrainment inlet into the passage;
   a motorized fan arranged to draw air from the first air entrainment inlet and eject a first air stream outwardly of the outlet end; and
   a manifold having a shape configured to substantially correspond to that of the outlet end and having a plurality of spaced apart water nozzles about the manifold through which water is pumpable;
   said plurality of spaced apart water nozzles are arranged with adjacently located ones of the plurality of spaced apart water nozzles being angled relative to one another such that adjacent water streams associated with respective ones of the plurality of spaced apart water nozzles intersect the first air stream at spaced apart locations relative to one another;
   said plurality of spaced apart water nozzles include first nozzles and second nozzles that are located in an alternatively staggered arrangement about the manifold, the first nozzles being configured to direct water in first water streams substantially toward a center of the first air stream and the second nozzles being configured to direct water in second water streams that are relatively more inline with the first air stream.

21. The device according to claim 20, wherein the device includes a second air entertainment inlet arranged to induce a second air stream from the surrounding atmosphere into an interior of the manifold so as to join the first air stream.

* * * * *